United States Patent [19]
Lagace

[11] Patent Number: 5,922,262
[45] Date of Patent: Jul. 13, 1999

[54] METHOD AND APPARATUS FOR PROCESSING ORGANIC WASTE MATERIAL

[76] Inventor: Gerald Lagace, 215 Dunlop Street East, Suite 403, Barrie, Ontario, Canada, L4M 1B2

[21] Appl. No.: 08/793,954

[22] PCT Filed: Mar. 14, 1994

[86] PCT No.: PCT/CA94/00143
§ 371 Date: Mar. 12, 1997
§ 102(e) Date: Mar. 12, 1997

[87] PCT Pub. No.: WO95/07814
PCT Pub. Date: Mar. 23, 1995

Related U.S. Application Data

[63] Continuation-in-part of application No. 07/944,949, Sep. 15, 1992, abandoned.

[30] Foreign Application Priority Data

Sep. 15, 1993 [CA] Canada ................................. 2106219

[51] Int. Cl.[6] ............................. B29B 7/38; B29B 9/06; B30B 11/22; B30B 11/24
[52] U.S. Cl. ......................... 264/142; 425/202; 425/208; 425/308; 425/311; 425/328 R; 425/464
[58] Field of Search .................................. 264/140, 142; 425/202, 208, 308, 311, 328 R, 464

[56] References Cited

U.S. PATENT DOCUMENTS

| | | | |
|---|---|---|---|
| 2,412,709 | 12/1946 | Bowling | 425/311 |
| 2,488,129 | 11/1949 | La Lande, Jr. | 425/382 R |
| 2,952,888 | 9/1960 | Cornelius | 264/142 |
| 3,166,026 | 1/1965 | Crane | 425/308 |
| 3,304,578 | 2/1967 | Clute | 425/382 R |
| 3,382,538 | 5/1968 | Burner | 425/196 |
| 3,849,046 | 11/1974 | Kalakov et al. | 425/208 |
| 5,158,730 | 10/1992 | Pawelczyk et al. | 264/311 |
| 5,486,102 | 1/1996 | Ettie et al. | 425/202 |

FOREIGN PATENT DOCUMENTS 57-034657  2/1982  Japan .

*Primary Examiner*—Leo B. Tentoni
*Attorney, Agent, or Firm*—Venable; George H. Spencer; Ashley J. Wells

[57] ABSTRACT

Apparatus and method for processing of material such as organic waste material by compressing and extruding the material, with subsequent optional pelletization. In one embodiment, an apparatus includes a container having inlet and outlet ends. There is a first plate (70) at the outlet end and rotatable about an axis extending between the ends. There is a second plate (28, 46) axially spaced apart from the first plate having a leading radial edge and a surface facing toward the outlet end angled from the leading edge toward the outlet end for forcing material in contact therewith axially toward the outlet end so as to compress material between the first and second plates as the second plate rotates about the axis. The first plate has apertures for extrusion of material. A second embodiment apparatus includes a compression zone at the outlet end including means for exerting compressive forces on material in the zone in an axial direction toward the outlet end so as to compress the material. There is slicing means (108) for movement in a direction transverse to the axial direction for slicing off a portion of the compressed material and a surface associated with the slicing means oriented to force the sliced portion toward the outlet end.

28 Claims, 11 Drawing Sheets

5,922,262

METHOD AND APPARATUS FOR PROCESSING ORGANIC WASTE MATERIAL

This is a continuation-in-part of U.S. Ser. No. 07/944,949 filed Sep. 15, 1992, now abandoned.

FIELD OF THE INVENTION

This invention relates to a method and an apparatus for processing of materials such as organic waste material. In particular, this invention relates to an apparatus for compressing and extruding the material, with subsequent pelletization, if desired.

BACKGROUND TO THE INVENTION

The processing of material such as waste water residuals (sewage sludge), manure, yard waste, food processing wastes, etc., generally includes a stage in which the material is put into a form for subsequent use. Commonly, the material is pelletized for later use as fertilizer, for example.

Pellets are a desirable form because such wastes, even at the tail end of a processing stream have a large water component and relatively small pellets are more easily dried than non-pelletized material. In particular circumstances, such as the processing of sewage sludge into fertilizer, other materials are often mixed into the waste. Formation of the combined materials into evenly sized pellets results in a product in which the combined materials may be evenly distributed in use, such as during spreading onto a farmer's field. It has generally been found that it is necessary, or at least desirable to mix binding agents with the material of the processing stream prior to pelletization in order to ensure that the material have sufficient adhesion properties. Otherwise, the treated material might crumble apart, which is generally undesirable.

Several approaches to downstream pelletization of organic waste material and the like have been taken in the past. One pelletizer includes a large diameter disk having a shallow circumferential wall. The disk rotates about an axis perpendicular to the center of the disc and inclined to the horizontal. Moist material is fed onto the disk and sticks to the disk. As the disk rotates, pellets are formed.

Another approach involves a tilted cylindrical drum which rotates about the central axis of the drum. Material is fed into the raised end of the drum. Material is pelletized as the drum rotates. Interior drum walls having openings spaced radially inwardly of the drum periphery permit only the larger particles (which rise to the top of the rotating material) to flow towards the other end of the drum for eventual exit therefrom.

These two approaches produce the pellets desired in many situations, but suffer the disadvantage of being relatively slow. Pellet size and uniformity of size and shape of the pellets formed could be improved.

Yet another apparatus utilizes rollers which act against a cylindrical screen to force material through the screen web.

A known pelletizer utilizes a pair of horizontal rollers in abutting side-by-side contact with each other. The rollers rotate so that material may be fed downwardly into the crevice between the rollers. There are notches in each of the rollers which are aligned with each other so that material enters the notches, is compressed therein as the rollers rotate and expelled in pelletized form from the underside of the rollers.

In any event, to be effective, any pelletizer or pelletization process takes into account the fact that organic material being treated includes living matter, generally a bacterial component, the maintenance of which is generally desirable. For example, bacteria-containing sludge waste is desirable for use as fertilizer. Pelletization processes which kill or otherwise degrade the bacterial component to a degree sufficient to reduce the usefulness of the pelletized sludge as fertilizer are considered disadvantageous.

SUMMARY OF THE INVENTION

It has thus been found possible to compress and extrude such waste material according to the present invention. Extruded material may be cut into pellet-sized pieces as it is extruded from the apparatus if desired.

In a first broad aspect, an apparatus of the present invention includes a container for the material having an inlet end and an outlet end for the inflow and outflow of the material. There is a first plate located at the outlet end and rotatable with respect to the container about an axis extending between the inlet and outlet ends. There is a second plate located within the container and rotatable with respect to the container about the axis and axially spaced apart from the first plate. The second plate has a leading radial edge and a surface facing toward the outlet end angled from the leading edge toward the outlet end for forcing material in contact therewith axially toward the outlet end of the container so as to compress material between the first and second plates as the second plate rotates. The first plate has one or more apertures through it for extrusion of compressed material through the first plate as the first plate rotates.

According to a preferred aspect of the invention, described in greater detail below, the first plate rotates in a first rotational direction (either clockwise or counterclockwise) and the second plate rotates in the opposite direction as the material is processed through the apparatus. The plates are rotatable at independently selected speeds so as to select the degree of compression of material.

The apparatus can include means for conveying material from the inlet end to the leading edge of the second plate.

In the preferred apparatus the container is oriented with the inlet end above the outlet end so that material travels under the force of gravity from the inlet end to the second (i.e., upper) rotating plate. Further, the apparatus includes a first stator located above the second plate and having walls defining a plurality of compartments so as to retain material positioned within each compartment (i.e., that has fallen or otherwise entered into the compartment) such that, as the leading edge of the second plate passes under each compartment as the second plate rotates, material within the compartment is brought into contact with the leading edge. The leading edge thus grabs the material to entrain it below the second plate into the zone of the apparatus between the first and second plates.

The apparatus most preferably includes another rotating member within the container vessel, rotatable about the axis and located above the first stator. The member has a pair of wings, generally coplanar with each other, having spaces therebetween to permit passage of material from the inlet end into the first stator. At least one of the wings, but preferably both, has an underside angled downwardly of the wing's leading edge so as to force downwardly material in contact with the underside.

There can be a second stator located above the rotatable member and having walls defining a plurality of compartments so as to position material within each compartment such that as the member rotates to a position such that one of the spaces between the wings brings the compartment into communication with an underlying compartment of the first stator to permit material to fall under the force of gravity from the compartment into the underlying compartment of the first stator.

There can be a third stator located between the first and second plates and having walls defining a plurality of compartments so as to limit rotational movement of material within the compartments.

Preferrably, the apertures of the first plate are angled downwardly and away from the direction of rotation the first plate so as to facilitate flow of material thereinto as the first plate rotates. Further, the walls of the third stator can be angled downwardly and in the direction of rotation of the second plate so as to enchance flow of material in the direction of the apertures as the first and second plates rotate.

In a very specific embodiment, the apparatus includes a powered shaft rotatable about the axis having the second plate and rotatable member fixedly mounted thereto. The first plate is rotatably mounted on the same shaft but powered by a second a motor geared to rotate the first plate.

As previously mentioned, the apparatus may include cutting means for cutting material to a predetermined length as the material emerges from the apertures of the first plate.

In a second broad aspect, an apparatus of the present invention includes a container for material to be processed having inlet and outlet ends. There is a compression zone at the outlet end within the container including means for exerting compressive forces on material in the zone in an axial direction toward the outlet end so as to compress the material. There is slicing means within the container and located toward the outlet end for movement in a direction transverse to the axial direction for slicing off a portion of the compressed material. There is a surface associated with the slicing means having an axial component such that the surface is oriented to force the sliced portion toward the outlet end with movement of the slicing means. As with the first broad apparatus aspect, there is extrusion means at the outlet end having apertures located to accept therethrough material forced toward the outlet end by the surface whereby material is extruded from the outlet end of the container.

A preferred slicing means includes a rotatable plate having a side which is oriented toward the compression zone against which material is compressed by the means for exerting compressive forces. The means for exerting compressive forces can be a helical screw rotatable about an axis parallel to the axial direction.

The slicing means can further include a blade located to have a leading edge for slicing off a portion of the compressed material with rotational movement of the rotatable plate. The blade itself can have a surface oriented toward the outlet end shaped to guide the sliced off portion toward the apertures of the extrusion means. There can, of course be a number of blades and extrusion outlets.

In a first broad aspect of the method of the present invention, organic waste material or the like is processed by pressing the material into a cavity between first and second axially spaced apart parallel plates rotating about a common central axis in opposite rotational directions to each other. The method includes compressing the material between the plates by means of a surface on the first plate angled into the cavity and subsequently extruding the material through apertures in the second rotating plate.

More preferably, the first plate is located axially above the second plate and the method includes the step of feeding material to be processed onto the top of the first plate for entry into the cavity through one or more openings in the first plate. The feeding step can include limiting rotation of material located between the first and second plates by means of a stator located above the second plate, the stator having upright walls defining compartments to retain material positioned in each compartment.

There can be a third plate located axially above the first plate and the feeding step can include the step of passing material to be processed under the force of gravity through openings between rotationally spaced apart wings of the third plate and compressing the material between the third and first plates by means of a surface on an underside of the third plate angled toward the first plate.

Compressing the material between the third and first plates can include the step of limiting rotation of material located between the third and first plates by means of a stator located therebetween, the stator having upright wall defining compartments to retain material positioned in each compartment.

The feeding step can include limiting rotation of material located above the third plate by means of a stator located above the third plate, the stator having upright walls defining compartments to retain material positioned in each compartment.

The extruding step can include directing the material through apertures angled downwardly and away from the direction of the rotation of the second plate.

In a second broad aspect of the method of the present invention, processing the material includes forcing the material against a moving plate having a planar motion by pressing the material in an axial direction perpendicular to the plane of motion. This is followed by slicing off a portion of the material being compressed by means of a blade moving parallel to the motion of the plate and extruding the sliced off portion through one or more apertures in the plate.

The method, of course can include a step of cutting the material to length as the material emerges from the apertures.

BRIEF DESCRIPTION OF THE DRAWINGS

Certain embodiments of the invention are described with reference being made to the accompanying drawings wherein.

DETAILED DESCRIPTION OF THE INVENTION

Figure 1:
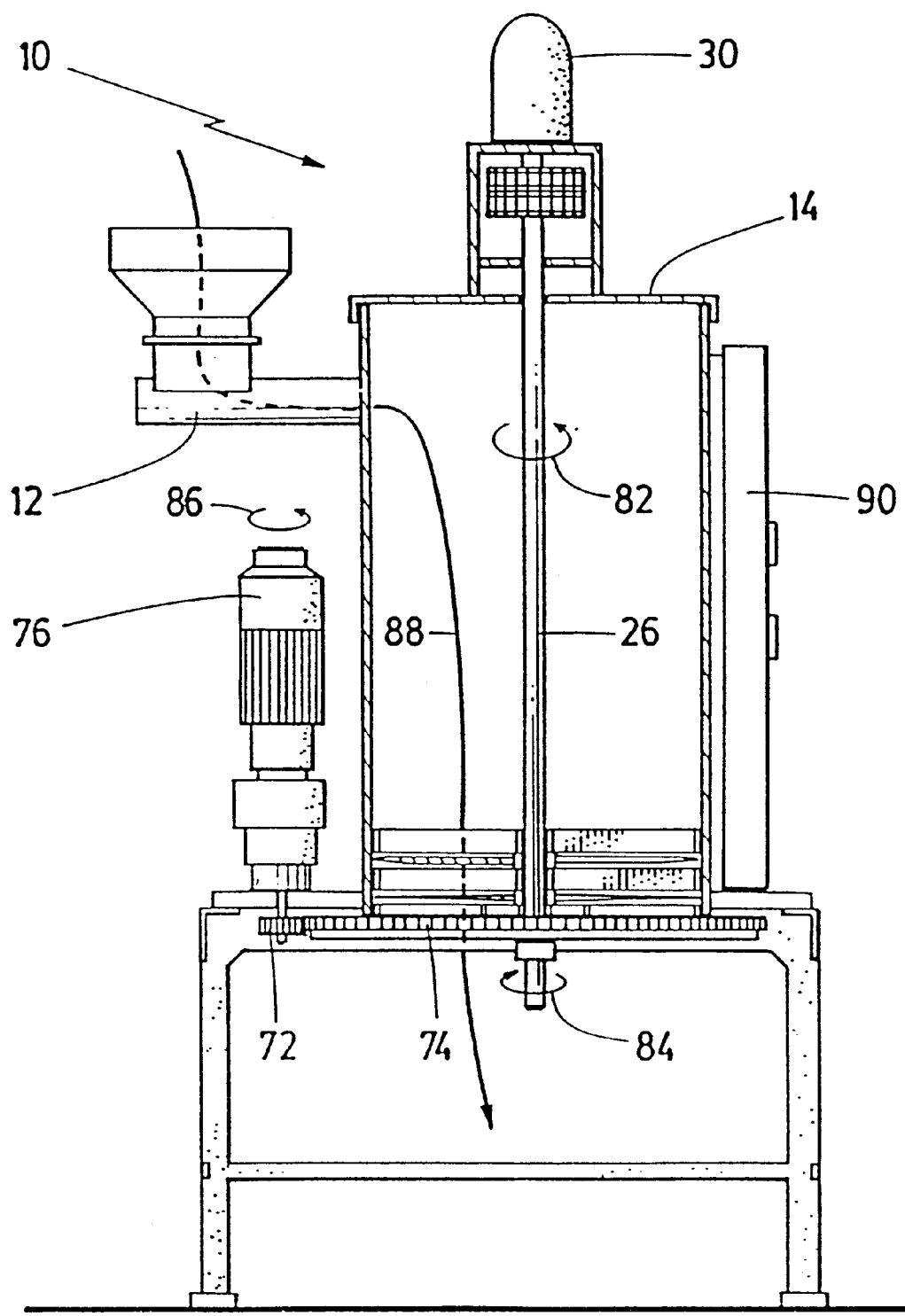
FIG. 1 is a side elevation of a first embodiment of the present invention in partial section.

Turning to the drawings, a first embodiment pelletizing apparatus 10 is shown generally in FIG. 1. Material to be pelletized is fed through an auger rotatingly housed in tube 12 into the upper end of drum 14. The material travels under the force of gravity toward the lower end of the drum where it is eventually entrained, compacted and extruded out of the bottom of the apparatus, the entrainment, compaction and extrusion portions of the appartus being described in greater detail below. Strands of extruded material are cut to length as desired by cutters well known in the art, and the newly formed pellets drop downwardly for collection.

Figure 2:
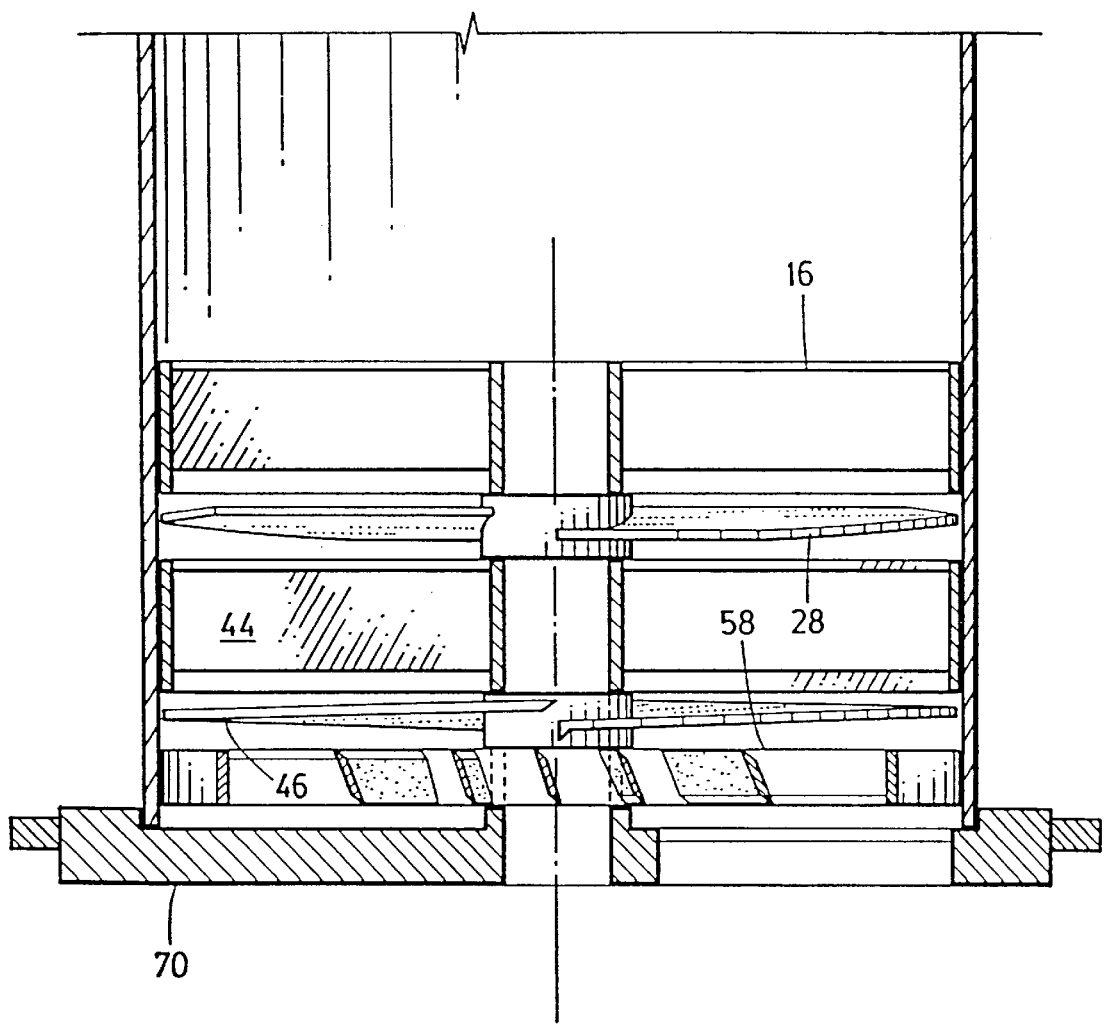
FIG. 2 is a detail in elevation of compacting and extruding portions of the FIG. 1 embodiment.
Figure 3:
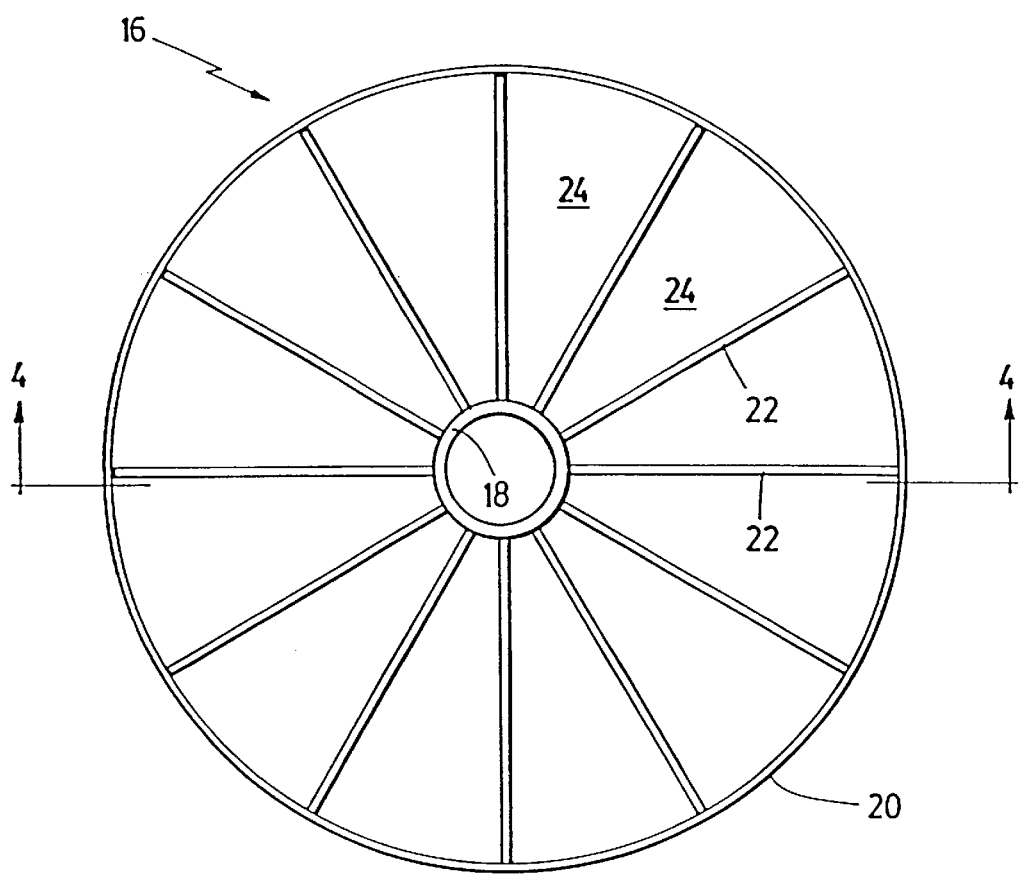
FIG. 3 is a top plan view of the uppermost stator of the FIG. 1 embodiment, this being the same as the middle stator.
Figure 4:
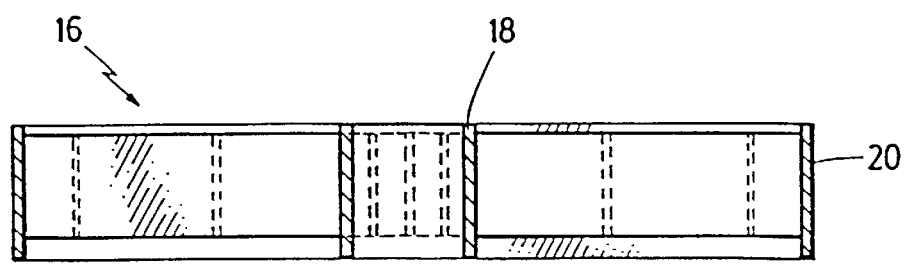
FIG. 4 is a sectional view of the stator shown in FIG. 3 taken along 4—4 of FIG. 3.

A detailed view of the entrainment, compaction and extrusion portions of the apparatus is shown in FIG. 2. The uppermost member of this part of the appartus is stator 16, shown in even greater detail in FIGS. 3 and 4. Stator 16 is installed in a fixed position with respect to the drum. The stator includes inner collar 18, rim 20 connected to each other by dividers 22 so as to be divided into pie-shaped compartments 24. Each divider lies on a radius extending outwardly from the central axis of shaft 26 and is spaced by about 30° from its neighboring dividers.

Figure 5:
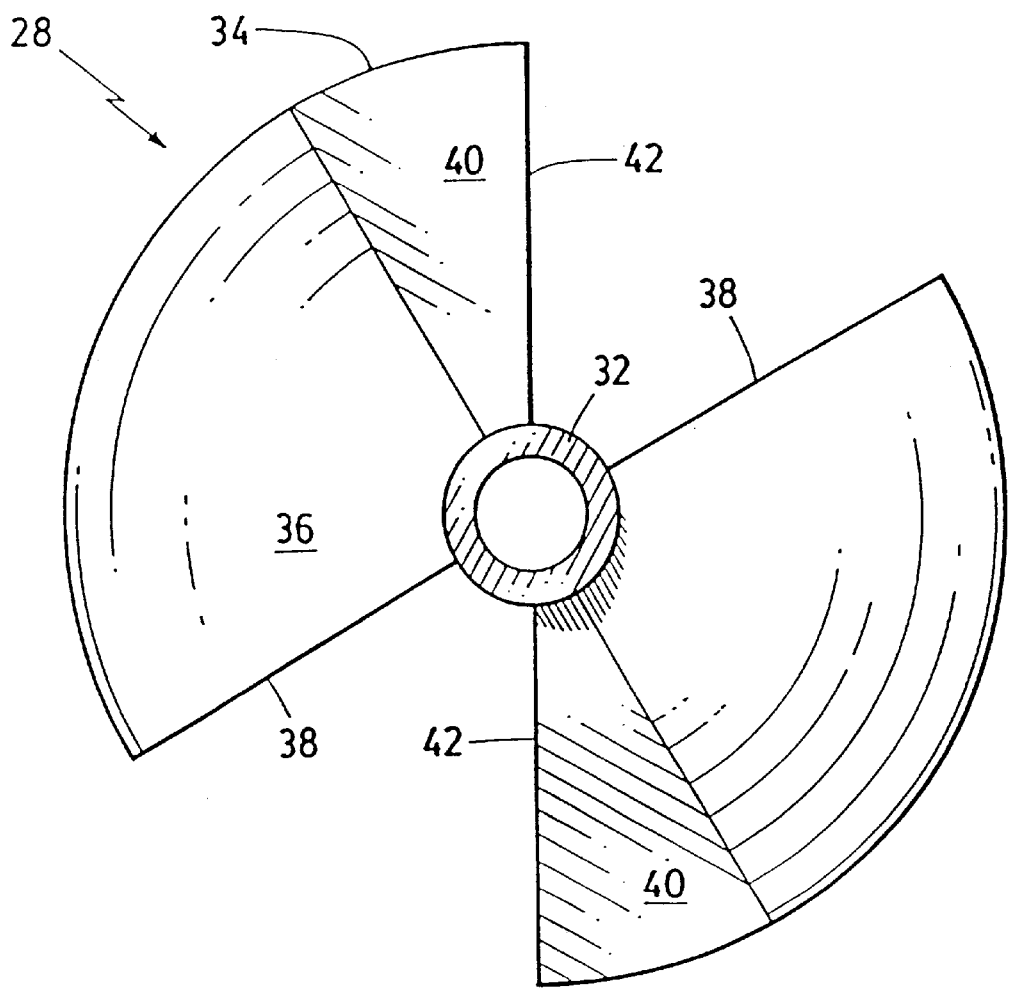
FIG. 5 is a top plan view of the uppermost rotating member of the FIG. 1 embodiment.
Figure 6:
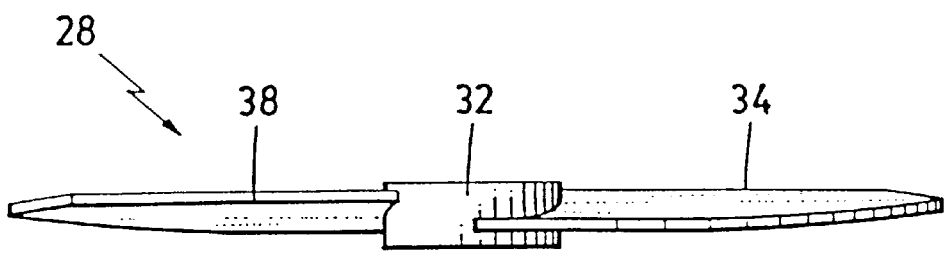
FIG. 6 is a side elevation of an uppermost rotating member shown in FIG. 5.

Located in-line immediately below the uppermost stator is member 28 affixed to vertical rotary shaft 26, under rotational control of motor 30. Rotary member 28 is shown in greater detail in FIGS. 5 and 6. Collar 32 of member 28 is affixed to shaft 26 by a key received in a keyway and fixed in place by a set screw. Member 28 includes two essentially identical wings 34 affixed to its central collar, the wings being symmetrically located with respect to each other about a central vertical axis of the member. A first portion 36 of each wing descends downwardly from its leading edge 38 about 1¼ inches (about 3.2 cm) through an angle of about 90°. The remaining 30° portion 40 lies generally in a plane perpendicular to the vertical. Leading edge 38 and following edge 42 of each wing each lie generally on a radius extending horizontally outwardly from the central axis of shaft 26 and are spaced about 120° from each other. The leading edge portion of the wing is curved or otherwise bevelled downwardly in the rotational direction of the following edge of the wing.

Located in-line immediately below upper rotary member 28 is a second stator 44. Middle stator 44 is essentially identical in shape to uppermost stator 16, but it is rotationally offset from the first stator such that each divider 22 of the underlying stator bisects the pie-shaped compartment of the overlying stator when viewed from above. Stators 16, 44 are fixed with respect to rotary shaft 26 which passes through the central collars of the stators. The stators are each fixed in position with respect to drum 14 to which they are bolted. The vanes or dividers 22 of the stators act to limit rotation of material in stator compartments and in this way are considered to be oriented in an upright position.

Figure 7:
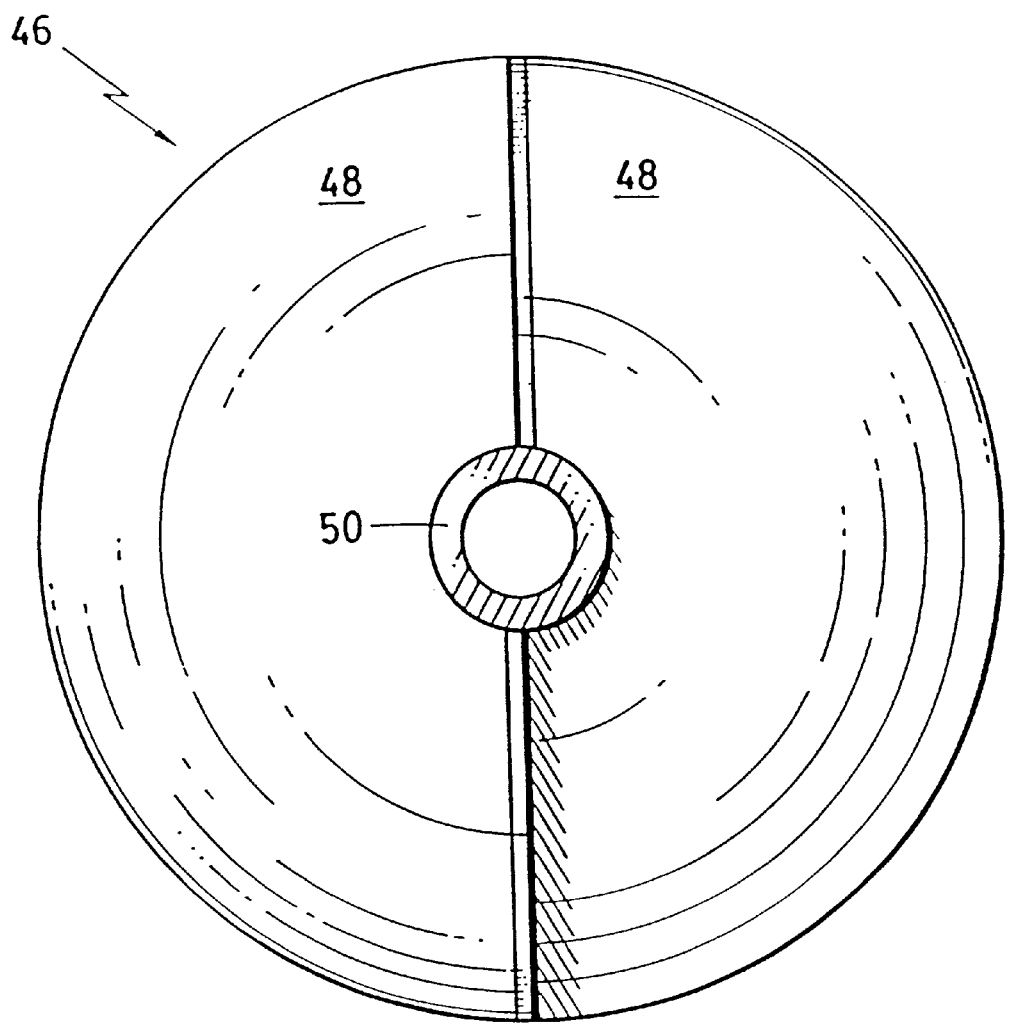
FIG. 7 is a top plan view of the middle rotating member of the FIG. 1 embodiment.
Figure 8:
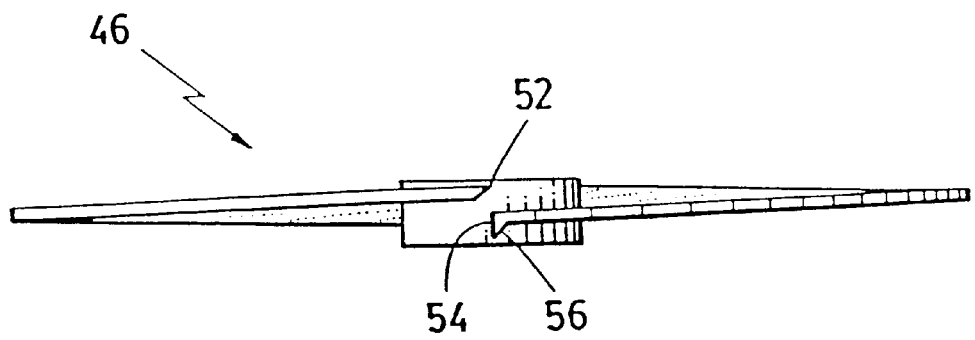
FIG. 8 is a side elevation of the middle rotating member shown in FIG. 7.
Figure 9:
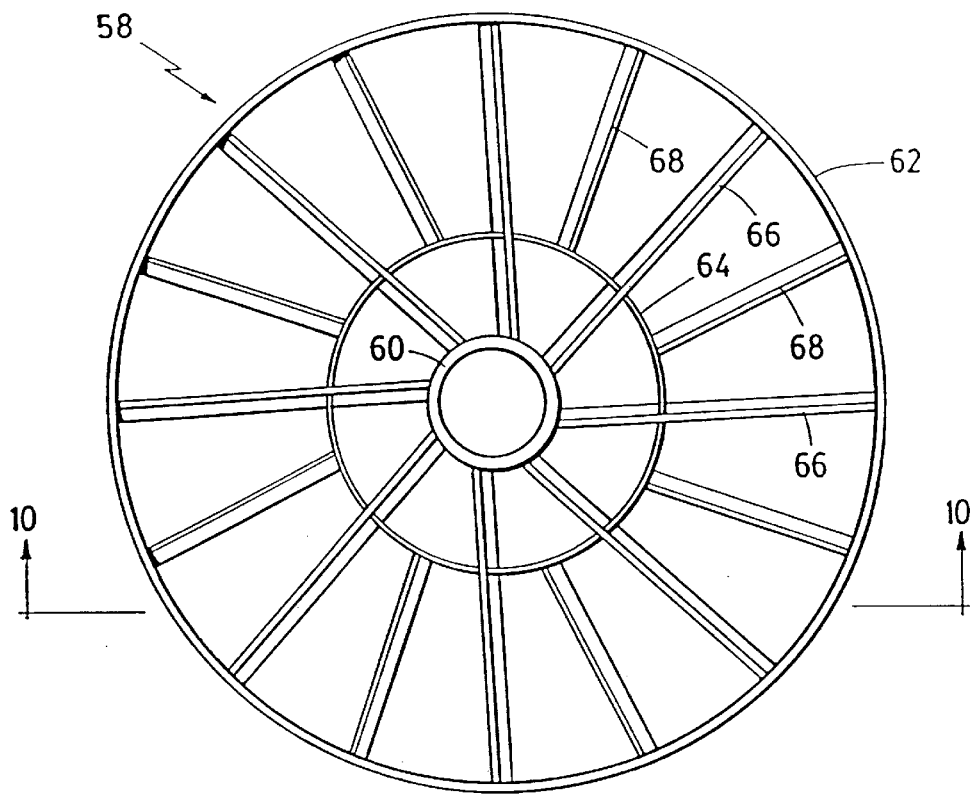
FIG. 9 is a top plan view of a lower stator of the FIG. 1 embodiment.
Figure 10:
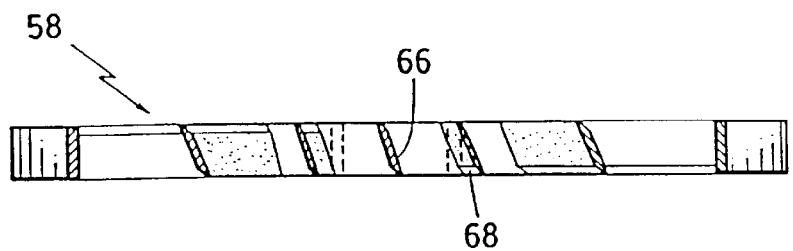
FIG. 10 is a side elevation of the lower stator shown in FIG. 9.
Figure 11:
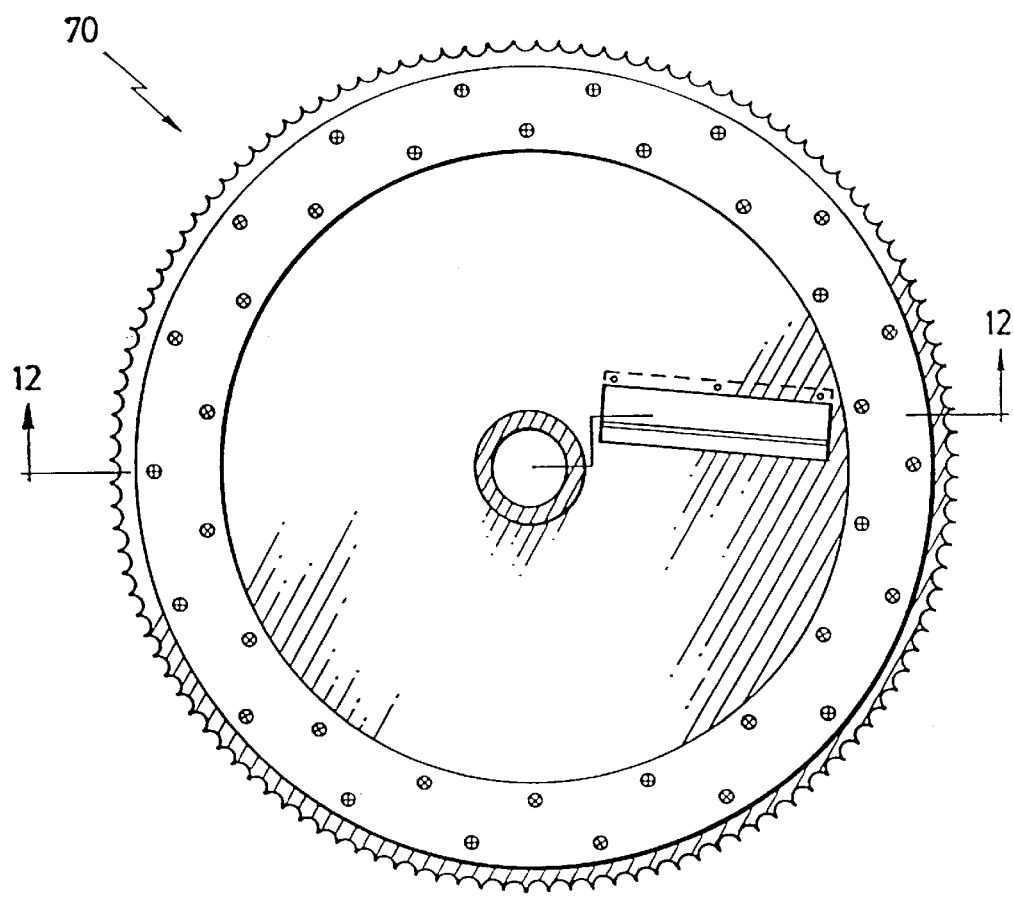
FIG. 11 is a top plan view of a lowermost rotating member of the FIG. 1 embodiment.
Figure 12:
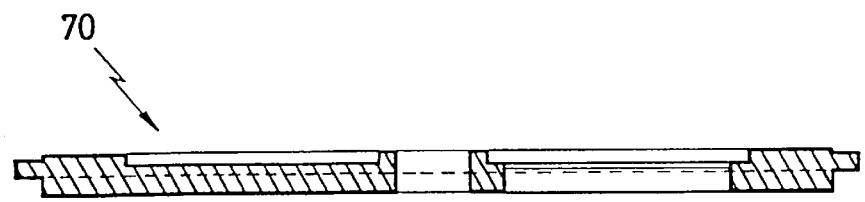
FIG. 12 is a sectional view taken along 12—12 of FIG. 11.
Figure 13:
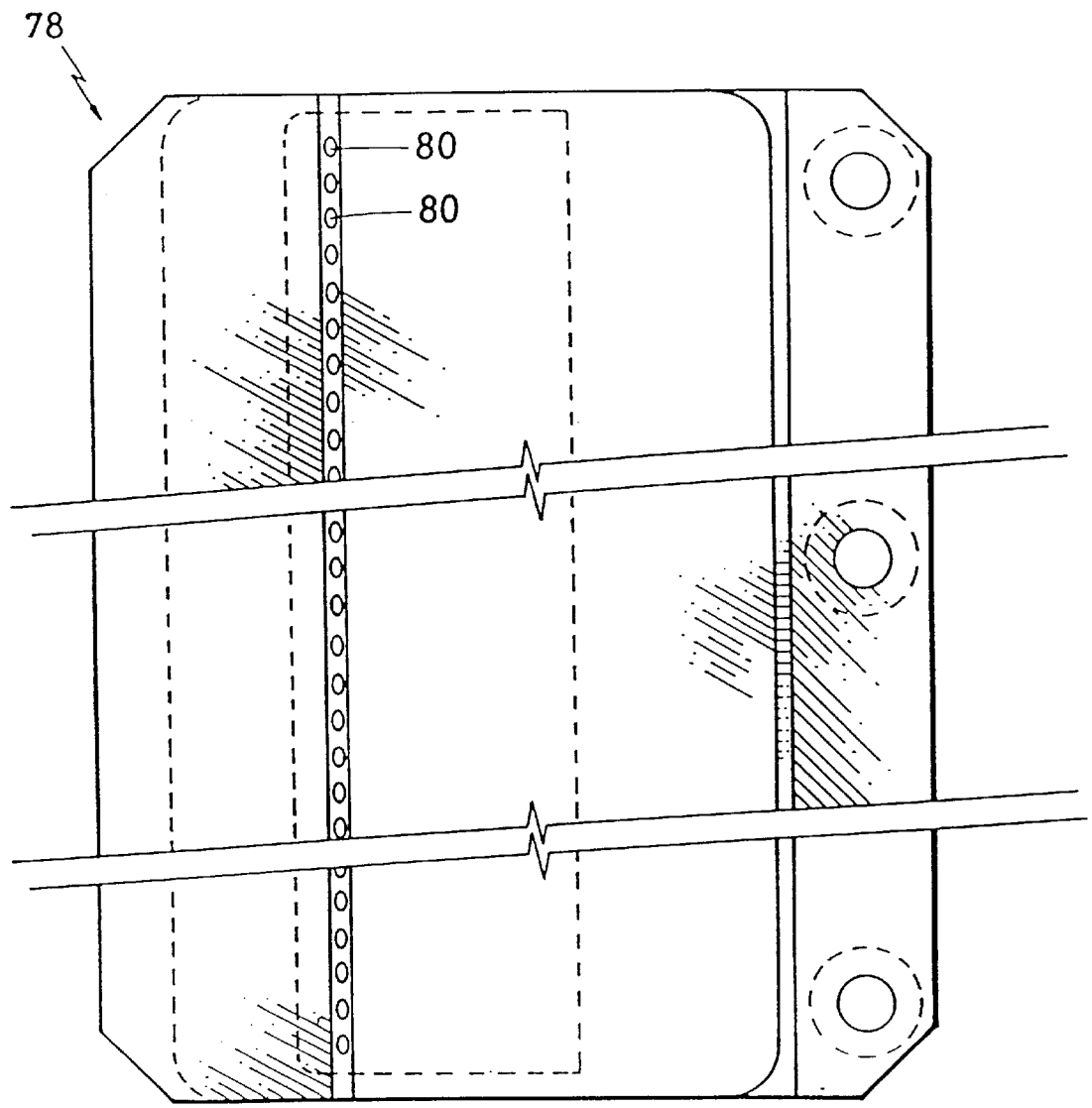
FIG. 13 is a top plan view of an extruder die for use as part of the FIG. 1 embodiment.
Figure 14:
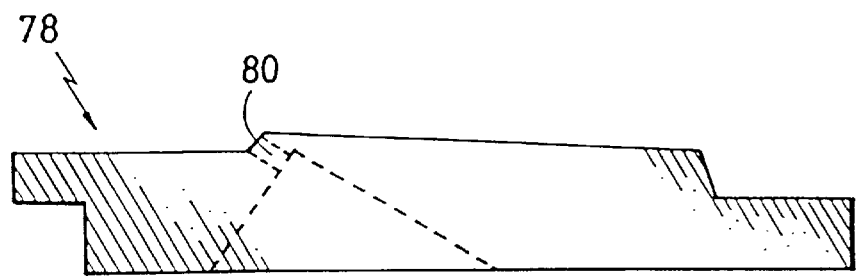
FIG. 14 is a side elevation of the die of FIG. 13.
Figure 15:
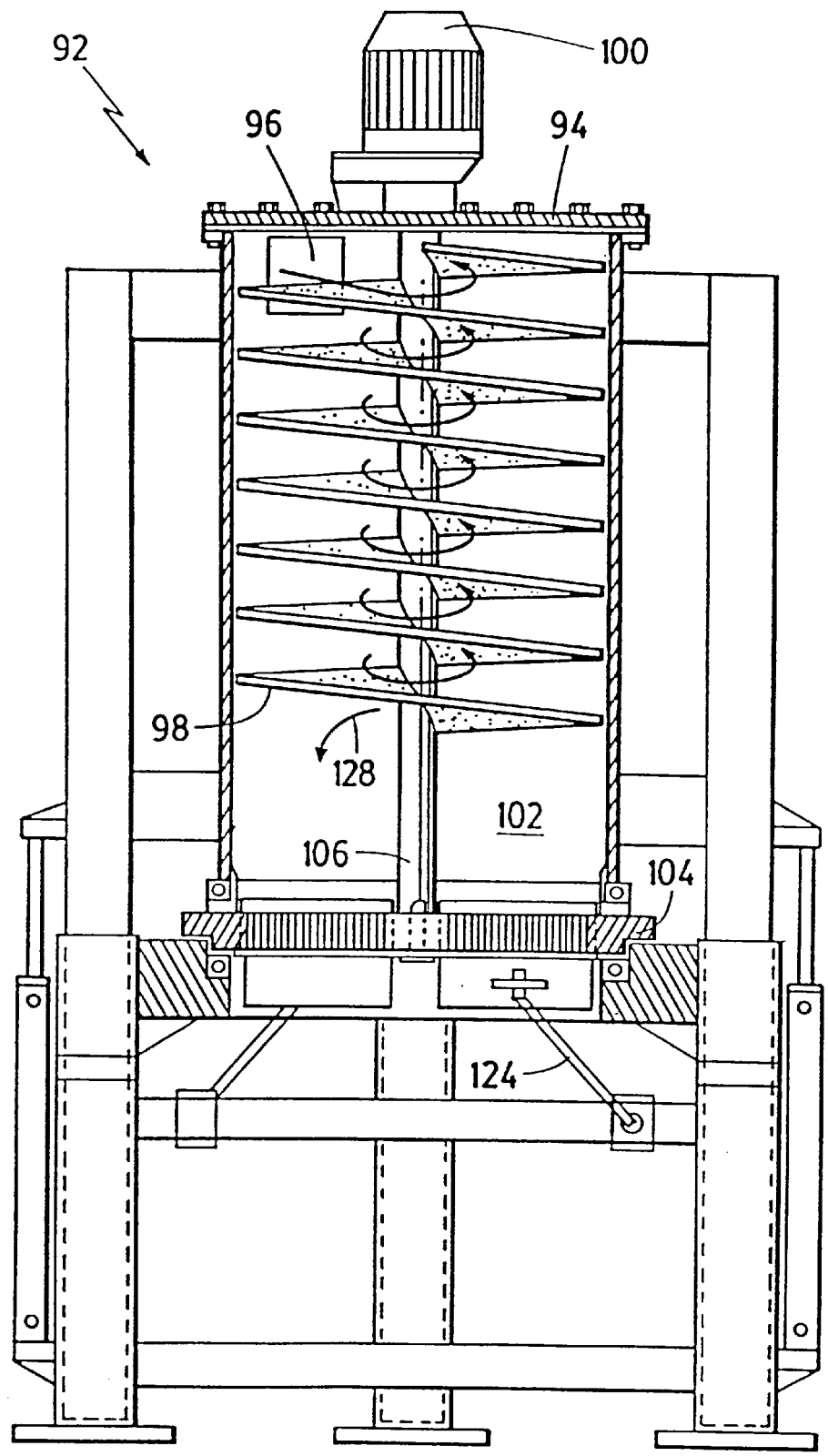
FIG. 15 is a side elevation of a second embodiment of the present invention in partial section.
Figure 16:
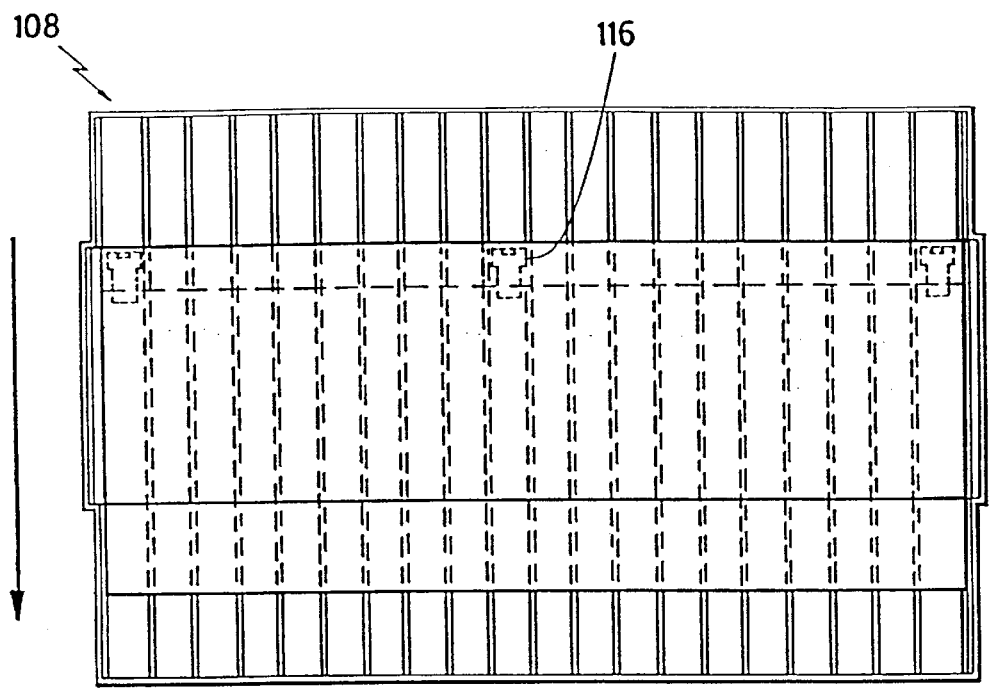
FIG. 16 is a top view of a cutting-extruder member for use as part of the FIG. 15 embodiment.
Figure 17:
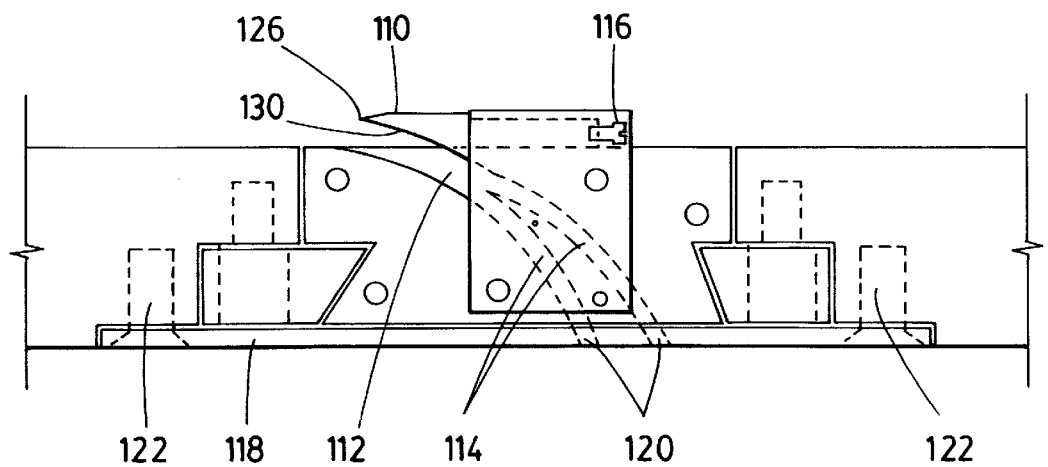
FIG. 17 is a side elevation of a portion of the cutting-extruder member shown in FIG. 16 as seen from the right hand side of FIG. 16.
Figure 18:
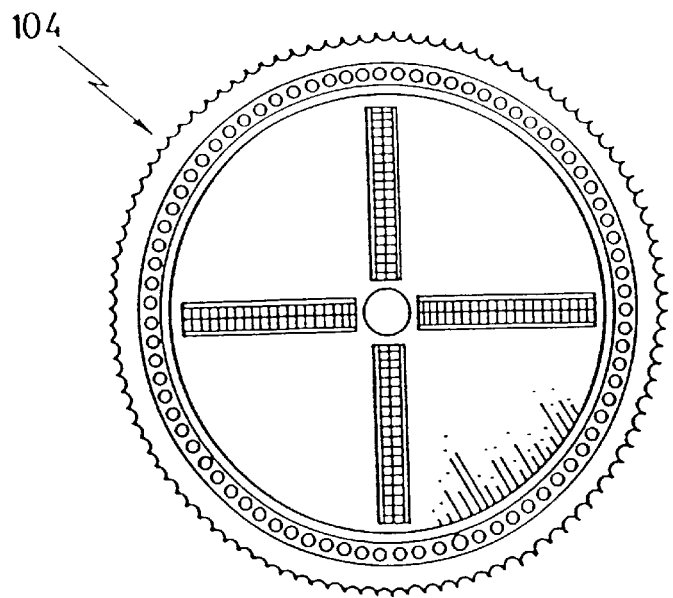
FIG. 18 is a top plan view of a rotary wheel of the FIG. 15 embodiment.
Figure 19:
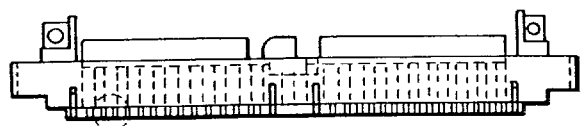
FIG. 19 is a sectional view taken along 19—19 of FIG. 18 showing an enlarged detail of extruder outlets.
Figure 19A:
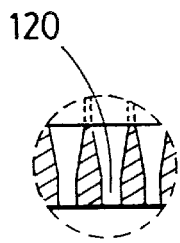
Figure 20:
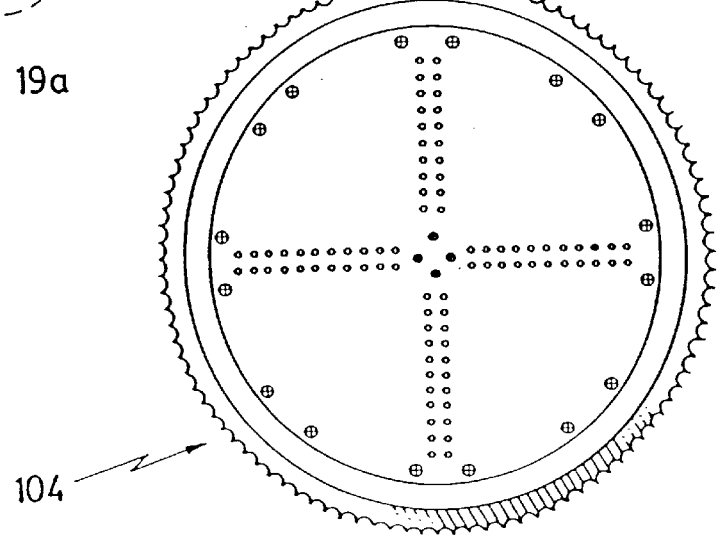
FIG. 20 is a bottom plan view of the rotary wheel shown in FIG. 18.

Located in-line immediately below intermediate stator 44 is member 46 affixed to rotary shaft 26. Rotary member 46 is shown in greater detail in FIGS. 7 and 8. Rotary member 46 includes two essentially identical wings 48 rigidly affixed to central collar 50. As seen in plan view, each wing 48 is more or less semi-circular. The leading edge 52 of each wing 48 of the middle rotary member is spaced above the following edge 54 of the other wing. Each wing descends downwardly from its leading edge to its following edge about ¾ of an inch (about 1.9 cm). Protruding from the underside of the trailing end of each wing 48 is deflector 56 which is rougly triangular in cross-section. Deflector 56 spans the full extent of following edge 54.

Located in-line immediately below rotary member 46 is lower stator 58. Stator 58, like the other stators, is installed in a fixed position with respect to the drum. Stator 58 includes inner collar 60, outer rim 62, and intermediate ring 64, the three annular elements being concentric with one another. Tilted vanes 66 extend radially outwardly from collar 60 to rim 62. Similarly angled vanes 68 extending radially outwardly from ring 64 to rim 62. There are eight of each of vanes 66, 68, respectively, the differently extending vanes alternating with each other and being evenly spaced from each other. There is thus an angle of 45° between neighboring vanes 66, each of which angle is bisected by one of vanes 68. All of the vanes are tilted in the same direction and to about the same extent, roughly 45° with respect to the vertical (which is greater than the extent of the tilt shown in the figures).

Located in-line immediately below the lower stator is lowermost rotary member 70. Member 70 is rotatably mounted with respect to shaft 26. Member 70 is under the rotational control of pinion 72, the member and pinion being operably connected by meshing teeth 74, the pinion being powered by motor 76.

Lowermost member 70 is fitted with die 78 containing a row of extruder apertures 80. As can be seen most readily in FIGS. 11 to 14, die 78 is held in place by screws on one side and supported by the lowermost member 70.

The arrangement is such that in operation, upper and middle rotary members 28, 46 rotate in the same direction and at the same speed as each other, these members being fixedly attached to rotary shaft 26 under the control of motor 30. Lowermost rotary member 70 is set to rotate in an opposite rotational direction to the other rotary members. Being under the control of separate motors, the rotational speed of the lower member 70 can thus be set independently of upper and middle rotary members 28 and 46. The relative rotational directions of shaft 26, rotating extruder disc 70 and pinion 72 are shown by arrows 82, 84, 86, respectively.

Material fed into the apparatus follows the path generally illustrated by arrow 88. The amount of inflow is controlled by the speed of an auger (not shown) located in inlet duct 12. The feeding auger is operated by a separately controlled motor, also not shown. Material drops into compartments 24 of the uppermost stator. Distribution of such material may be mechanically enhanced, as desired, by a vertical auger rotating above stator 16.

The divider walls of the uppermost stator limit rotation of material in the compartments in reaction to contact with the top surface of upper rotating member 28. As member 28 rotates in a counterclockwise direction, as viewed from above the apparatus, material can fall between the gap between the following edge of one rotating wing and the leading edge of the other wing. Such material is captured or entrained by the upper rotating member and pressed into compartments of the middle stator. The downwardly sloping underside of rotating member 28 forces entrained material downwardly into compartments of the middle stator.

Rotating immediately below the middle stator is middle rotating member 46. Material is drawn into compartments of the lower stator by rotating member 46. As member 46 rotates, material being forced downwardly through the compartments of the middle stator is captured under leading edge 52. The underside of each wing of member 46 is inclined to force material in contact therewith in a downward direction as the member rotates.

In full operation, once a steady-state flow of material is reached, compartments of the middle and lower stators are generally full of material. Material is continuously being captured by the upper rotating member and fed into compartments of the middle stator. In turn, material is constantly drawn and compressed into compartments of the lower stator by the middle rotating member.

Egress of the material out of compartments of the lower stator is through the holes 80 of extruder die 78. The plates or vanes of the lower stator are angled so as to force compressed material passing through the stator in a generally counterclockwise direction. Extruder apertures 80 are oriented so as to accept therethrough material as lowermost member 70 rotates in a clockwise direction. Exiting material is cut to the length desired by conventional cutters, illustrated below in connection with a second embodiment. It is possible that material would be extruded and formed to length, if at all, at some later time.

In operation, the speed of rotation of the rotating capturing and compressing members and the speed of rotation of the bottom rotating plate member are independently controlled. It is possible to select the pressure being exerted on the compressed material in the lower stator from a range of pressure by varying these relative speeds. The faster the lower plate rotates with respect to the upper two rotating members, the lower the pressure exerted on compressed material within the compartments of the lowermost stator. Lowering the relative rotational speed of the lowermost plate with respect to the upper rotating members will, of course, raise the pressure exerted on the compressed material, thereby increasing the degree of compaction of the material prior to extrusion.

Drum 14 of the illustrated apparatus has an inner diameter of about 30 inches (about 76 cm). The upper stator and the middle stator each have a height of about three inches (about 7.6 cm) while the lower stator has an overall height of about two inches (about 5.1 cm). The rotary shaft and the extruder plate are each driven by a 20 horsepower gear motor having a speed which can be varied thanks to an AC inverter control, and a specific output torque.

The apparatus shown is of mill steel. Rotating members 28, 46 are each fixedly connected to rotary shaft 26 by means of a key received in a key way and set screws.

It has been found possible, with the illustrated first embodiment apparatus, to process sewage sludge containing appropriate binding agents and a water content of about 40%, at a continuous throughput rate of about eight tons per hour. A single extuder die having twenty-eight ⅜-inch holes was used. An appropriate turning speed of the upper rotating members 28, 46 connected to the rotary shaft was found to be 26 r.p.m. A satisfactory turning speed of the lower rotating extruding member 70 was found to be 15 r.p.m. Suitably compacted sludge appropriate for use as fertilizer was thus obtained. Tests determined that the bacterial content of the processed sludge was satisfactory for the product to be used as fertilizer.

It is expected that the disclosed apparatus could well process a material having a moisture component selected from over a wide range. It should be possible to process a stock material having anywhere from about 5% to 60% water, or possibly higher with the single apparatus. An upper limit of the water component would be reached where it is no longer possible to obtain extruded material of the desired consistency. Obviously the parameters of operation, relative and absolute speeds of the various components, would have to be varied to obtain results desired in a particular situation. It might also be preferrable to alter the number of dies used, etc.

Die 78 of the first embodiment is installed so as to be interchangeable with other dies. In this way dies having extruder holes of various diameters may be intstalled as needed. It will further be appreciated that the extruder wheel may be fit with more than one die. It would generally be preferred, although not absolutely necessary, that dies be evenly angularly spaced from each other. A given die may have more than one row of extrusion outlets. Many variations are possible. Die sets having as few as one hole could be used, extruding holes could be drilled directly into rotating member 70, etc.

An apparatus of the present invention would often be used as part of a pre-existing sewage treatment process. As such, modifications to the apparatus might be necessary to adapt the invention for such use. For example, an apparatus having a larger throughput may be desired. The size of the components of the apparatus could be suitably chosen. It may be desirable, for whatever reason to have material fed into the lower end of the apparatus and extruded from the upper end. If the apparatus were inverted to accommodate such a requirement, a mechanism for conveying material from the apparatus inlet to the rotating entrainment plate would be necessary. An auger similar to that described below in connection with a second embodiment apparatus could provide such a suitable conveying means. It might be required, under particular circumstances, that material be expelled through a stationary, rather than a rotating extruder. It is the relative movement of the apparatus components that is important. Thus, in such case, the rotating parts of the illustrated embodiment could be fixed in place and the stationary parts, such as the drum and stators could be arranged so as to rotate, appropriate modifications to other portions of the appartus being made.

As part of a larger material processing operation, in which inflow of material into the apparatus varies from time to time, appropriate sensors could be installed to alter the speed of operation of the apparatus in response to such variations. This would be done to ensure that the stator compartments of the apparatus remain full, i.e., that the preferred steady-state flow of material is maintained so as to maintain a fairly constant degree of compaction of material.

The motors of the illustrated embodiment are under AC inverter control which are under computer control, circuitry being contained in panel 90. Parameters for operation of the various components can thus be pre-set, facilitating operation of the apparatus.

A second embodiment apparatus 92 is illustrated in FIGS. 15 to 20. Drum 94 is provided with feedstock material inlet 96 at its upper end. Rotary auger 98 is under the control of motor 100. Below compression zone 102 is provided rotary wheel 104, journaled about the central shaft 106 of rotary auger 98 so as to have the same axis of rotation as the auger. Rotary wheel 104 is powered by an arrangement similar to that shown for the lowermost extruder wheel of the first embodiment apparatus, described above.

Rotary wheel 104 is fitted with four cutting-extruder members 108. Member 108 provides blade 110. Aperture 112 below blade 110 curves downwardly and communicates with extruder channels 114. The position of the slicing blade can be adjusted by means of screw 116. Plate 118 defines extruder outlets 120, the plate being held in place by screws 122. Conventional cutters 124 are provided to cut material as it emerges from extruder outlets 120.

In operation, the auger is rotated in a direction to convey feedstock downwardly toward compression zone 102, in the case of the illustrated embodiment, in the clockwise direction as viewed from above. Rotary extruder wheel 104 is rotated in a direction such that leading edge 126 of blades 110 slice off material in the compression zone, in the case of the illustrated embodiment, in the clockwise direction as viewed from above. The rotational speeds of the auger and rotary wheel can be set independently of each other.

Material is thus fed into drum 94 through inlet 96 and generally follows the path of arrow 128. Eventually the compression zone becomes filled with material which then undergoes compaction due to compressive forces exerted by the auger and in-flow of additional material. Once a suitable pressure is reached within the compression zone, rotary wheel 104 is turned on and blades 110 slice off portions of the material as the wheel rotates. Material is forced downwardly by bearing surfaces 130 through apertures 112 and out of the drum through extruder outlets 120. Cutters 124 serve to cut the extruding strands of material into appropriate lengths.

As with the first embodiment, there are many variations available to a person skilled in the art to the second embodiment which lie within the scope of the invention as defined in the appended claims.

Both embodiments of the invention disclosed herein are for use in industrial-type settings and it will be appreciated that the invention can be used to process and pelletize material continuously. It will of course be understood that variations in the size of the apparatuses, materials of construction, the precise means for providing relative movement of the compaction and extrusion components, etc. can be varied and remain well within the scope of the invention. For example, the mill steel of the disclosed embodiment could be any suitable material, such as hard steel, stainless steel, plastic, particularly polyvinyl chloride, fiberglass, tool steel, etc. The scope of the invention is defined by the claims which follow.

I claim:

1. An apparatus for processing organic waste material, the apparatus comprising:
   a container for the material having an inlet end and an outlet end;
   a compression zone at the outlet end within the container including means for exerting compressive forces on material in the zone in an axial direction toward the outlet end so as to compress the material;
   slicing means within the container and located toward the outlet end for movement in a direction transverse to the axial direction for slicing off a portion of the compressed material, there being a surface associated with the slicing means having an axial component such that the surface is oriented to force the sliced portion toward the outlet end with movement of the slicing means, wherein the slicing means includes a rotatable plate having a side orientated toward the compression zone against which material is compressed by the means for exerting compressive forces; and
   extrusion means at the outlet end having apertures located to accept therethrough material forced toward the outlet end by the surface whereby material is extruded from the outlet end of the container.

2. The apparatus of claim 1 wherein the means for exerting compressive forces includes a helical screw rotatable about an axis parallel to the axial direction.

3. The apparatus of claim 1 wherein the slicing means further includes a blade located to have a leading edge for slicing off said portion with movement of said plate, which blade has a surface oriented toward the outlet end shaped to guide the sliced off portion toward the apertures of the extrusion means.

4. The apparatus of claim 3, wherein there is a plurality of the slicing means and extrusion means.

5. The apparatus of claim 1, further comprising cutting means for cutting material to a predetermined length as the material is extruded from the outlet end of the container.

6. An apparatus for processing organic waste material, the apparatus comprising:
   a container for the material having an inlet end and an outlet end;
   a first plate located at the outlet end and rotatable about with respect to the container about an axis extending between the inlet and outlet ends;
   a second plate located within the container and rotatable with respect to the container about the axis, the plate having a leading radial edge and a surface facing toward the outlet end angled from the leading edge toward the outlet end for forcing material in contact therewith axially toward the outlet end of the container so as to compress material between the first and second plates as the second plate rotates; wherein
   the first plate has one or more apertures therethrough for extrusion of compressed material therethrough as the first plate rotates.

7. The apparatus of claim 6 wherein the first plate is rotatable in a first direction and the second plate is rotatable in an opposite second direction.

8. The apparatus of claim 7 wherein the first and second plates are rotatable at independently selected speeds.

9. The apparatus of claim 6, further comprising means for conveying material from the inlet end to the leading edge of the second plate.

10. The apparatus of claim 8, wherein the inlet end is located above the outlet end such that material fed into the container moves toward the outlet end under the force of gravity.

11. The apparatus of claim 10, further comprising a first stator located above the second plate and having walls defining a plurality of compartments so as to retain material positioned within each compartment such that, as the leading edge of the second plate passes under each compartment as the second plate rotates, material within the compartment is brought into contact with the leading edge.

12. The apparatus of claim 11, further comprising a member within the container, rotatable with respect thereto about the axis and located above the first stator, the member having a pair of wings having spaces therebetween to permit passage of material from the inlet end into the first stator, at least one of the wings having an underside angled downwardly of a leading edge thereof so as to force downwardly material in contact with the underside.

13. The apparatus of claim 12, further comprising a second stator located above the rotatable member and having walls defining a plurality of compartments so as to position material within each compartment such that as the member rotates to a position such that a said space between the wings brings the compartment into communication with an underlying compartment of the first stator to permit material to fall under the force of gravity from the compartment into the underlying compartment.

14. The apparatus of claim 13, further comprising a third stator located between the first and second plates and having walls defining a plurality of compartments so as to limit rotational movement of material within the compartments.

15. The apparatus of claim 14, wherein the apertures of the first plate are angled downwardly and away from the direction of rotation the first plate so as to facilitate flow of material thereinto as the first plate rotates.

16. The apparatus of claim 15, wherein the walls of the third stator are angled downwardly and in the direction of rotation of the second plate so as to facilitate flow of material toward the apertures as the first and second plates rotate.

17. The apparatus of claim 16, further comprising a powered shaft rotatable about the axis, the second plate and rotatable member being fixedly mounted thereto.

18. The apparatus of claim 17, wherein first plate is rotatably mounted on the shaft, and further comprising a motor geared to rotate the first plate.

19. The apparatus of claim 18, further comprising cutting means for cutting material to a predetermined length as the material emerges from the apertures of the first plate.

20. A method for processing organic waste material, comprising the steps of:

forcing the material against a moving plate having a planar motion by pressing the material in an axial direction perpendicular to the plane of motion;

slicing off a portion of the material being compressed by means of a blade moving parallel to the motion of the plate; and extruding the sliced off portion through one or more apertures in the plate.

21. A method for continuous processing of organic waste material, comprising the steps of:

pressing the material into a cavity between first and second axially spaced apart parallel plates rotating about a common central axis in opposite rotational directions to each other;

compressing the material between the plates by means of a surface on the first plate angled into the cavity; and extruding the material through apertures in the second rotating plate.

22. The method of claim 20, further comprising the step of cutting the material to length as the material emerges from the apertures.

23. The method of claim 21, wherein the first plate is located axially above the second plate, and further comprising the step of feeding material to be processed onto the top of the first plate for entry into the cavity through one or more openings in the first plate.

24. The method of claim 23, wherein the feeding step further comprises limiting rotation of material located between the first and second plates by means of a stator located above the second plate, the stator having upright walls defining compartments to retain material positioned in each compartment.

25. The method of claim 24, wherein there is a third plate located axially above the first plate and wherein the feeding step includes the step of passing material to be processed under the force of gravity through openings between rotationally spaced apart wings of the third plate and compressing the material between the third and first plates by means of a surface on an underside of the third plate angled toward the first plate.

26. The method of claim 25, wherein compressing the material between the third and first plates includes the step of limiting rotation of material located between the third and first plates by means of a stator located therebetween, the stator having upright wall defining compartments to retain material positioned in each compartment.

27. The method of claim 26, wherein the feeding step includes limiting rotation of material located above the third plate by means of a stator located above the third plate, the stator having uprigh walls defining compartment to retain material positioned in each compartment.

28. The method of claim 27, wherin the extruding step includes directing the material through apertures angled downwardly and away from the direction of the rotation of the second plate.

* * * * *